(12) United States Patent
Finch

(10) Patent No.: US 8,924,980 B2
(45) Date of Patent: Dec. 30, 2014

(54) URGENCY BASED SCHEDULING

(75) Inventor: Derek Geoffrey Finch, Cowes (GB)

(73) Assignee: BAE SYSTEMS plc (GB)

( * ) Notice: Subject to any disclaimer, the term of this patent is extended or adjusted under 35 U.S.C. 154(b) by 1353 days.

(21) Appl. No.: 12/226,383

(22) PCT Filed: Aug. 29, 2008

(86) PCT No.: PCT/GB2008/050753
§ 371 (c)(1),
(2), (4) Date: Oct. 16, 2008

(87) PCT Pub. No.: WO2009/034369
PCT Pub. Date: Mar. 19, 2009

(65) Prior Publication Data
US 2010/0169890 A1 Jul. 1, 2010

(30) Foreign Application Priority Data

Sep. 12, 2007 (EP) .................................. 07270048
Sep. 12, 2007 (GB) .................................. 0717771.0

(51) Int. Cl.
*G01S 13/00* (2006.01)
*G06F 9/46* (2006.01)
*G01S 13/02* (2006.01)
*G01S 13/72* (2006.01)
*G06F 9/48* (2006.01)

(52) U.S. Cl.
CPC ................. *G01S 13/72* (2013.01); *G01S 13/02* (2013.01); *G06F 9/4887* (2013.01)
USPC ........................................... 718/103; 342/62

(58) Field of Classification Search
CPC .... G06F 9/4881; G06F 9/4843; G06F 9/4887
See application file for complete search history.

(56) References Cited

U.S. PATENT DOCUMENTS

| 3,587,054 A | 6/1971 | Byrne et al. |
| 4,720,711 A | 1/1988 | Quesinberry et al. |
| 4,851,850 A * | 7/1989 | Milan et al. ...................... 342/90 |
| 5,386,561 A * | 1/1995 | Huynh et al. ................. 718/103 |
| 6,665,262 B1 * | 12/2003 | Lindskog et al. ............. 370/216 |

(Continued)

FOREIGN PATENT DOCUMENTS

WO    WO 92/17796 A    10/1992

OTHER PUBLICATIONS

European Patent Office, International Preliminary Report on Patentability and Written Opinion, Mar. 25, 2010, from International Patent Application No. PCT/GB2008/050753, filed on Aug. 29, 2008.

(Continued)

*Primary Examiner* — Lewis A Bullock, Jr.
*Assistant Examiner* — Kevin X Lu
(74) *Attorney, Agent, or Firm* — Finch & Maloney PLLC

(57) ABSTRACT

The present invention relates to a method of scheduling for multi-function radars. Specifically, the present invention relates to an efficient urgency-based scheduling method.

The present invention provides a method of scheduling tasks in a radar apparatus including the steps of: receiving one or more tasks to schedule; calculating an urgency function for each said task; and storing the said tasks using said urgency function to order each said task relative to the other said tasks; wherein when a task is to be performed, the task having the highest value of urgency function is located.

26 Claims, 6 Drawing Sheets

(56) References Cited

U.S. PATENT DOCUMENTS

2006/0010443 A1* 1/2006 Lahti et al. .............. 718/100
2007/0277178 A1* 11/2007 Nagao et al. ............ 718/108
2008/0002999 A1* 1/2008 Taki et al. ................ 399/44
2008/0040190 A1* 2/2008 Khosla et al. ............ 705/9

OTHER PUBLICATIONS

Extended European Search Report issued Feb. 21, 2008 in connection with European Patent Application No. 07270048.7-2220.
Clifford W. Mercier, "An introduction to Real-Time Operating Systems: scheduling Theory", (Nov. 13, 1992), pp. 1-67. Retrieved from the internet: URL: www-md.e-technik.uni-rostock.de/ma/gol/rtsys/articulos/sur1_review.pdf> p. 39, paragraph 9; figure 26.
Umut Balli et al, "Utility Accrual Real-Time Scheduling under Variable Cost Functions", IEEE transactions on computers, IEEE service center, Los Alamitos, CA, US, vol. 56, No. 3, (Mar. 2007), pp. 385-401.
Abbott R. et al, "Scheduling real-time transactions" Sigmod Record USA, vol. 17, No. 1, (Mar. 1988), pp. 71-81.
Miranda, S. et al., "Knowledge-based resource management for multifunction radar: a look at scheduling and task prioritization", IEEE signal processing magazine IEEE USA, vol. 23, No. 1, (Jan. 2006), pp. 66-76.
Wray, M., "Software architecture for real time control of the radar beam within MESAR", Radar 92, International Conference Brighton, UK, London, UK, IEE, UK, (1992), pp. 38-41.

* cited by examiner

URGENCY BASED SCHEDULING

RELATED APPLICATION INFORMATION

This application is a U.S. National Phase Patent Application of International Patent Application No. PCT/GB2008/050753 which was filed on Aug. 29, 2008, and claims priority to British Patent Application No. 0717771.0, filed on Sep. 12, 2007, and claims priority to European Patent Application No. 07270048.7, filed on Sep. 12, 2007, the disclosures of each of which are incorporated herein by reference.

FIELD OF THE INVENTION

The present invention relates to a method of scheduling for multi-function radars. Specifically, the present invention relates to an efficient urgency-based scheduling method.

BACKGROUND INFORMATION

The most common known method of scheduling for radars comprises the following steps and is shown in FIG. 1. First, the scheduler makes a list of tasks that need to be carried out by the radar. Second, the scheduler uses a search algorithm to iteratively work out the best order for the tasks to be performed in for every possible combination of the tasks that need to be carried out. The best order criteria may vary depending on the use or situation of the radar. For example, the search algorithm may primarily look for the quickest possible sequence of tasks, perhaps factoring in whether certain tasks need to be performed in certain orders and whether certain tasks can't be performed at certain times.

A situation in which creating the best order list of tasks is particularly complicated is in naval situations, as shown in FIG. 2, where the platform 210 on which the radar is mounted moves (one position shown as 210a and one position shown as 210b) due to the motion of the sea 200 and radar visibility 220 changes (one position shown as 220a and one position shown as 220b) is limited for certain areas of sky, e.g. point A, at certain points in time.

The major problem with this known scheduling method is that it becomes exponentially harder to compute as the number of tasks increases. Another problem with this known scheduling method is that every time a new task is added to the list of tasks to be performed, the scheduler has to carry out another search to create a new best order list.

SUMMARY OF THE INVENTION

The present invention provides a method of scheduling tasks in a radar apparatus including the steps of: receiving one or more tasks to schedule; calculating an urgency function for each said task; and storing the said tasks using said urgency function to order each said task relative to the other said tasks; wherein when a task is to be performed, the task having the highest value of urgency function is located.

The solution of the present invention provides a more optimal approach to scheduling tasks to be performed by a radar.

DETAILED DESCRIPTION

Exemplary embodiments of the present invention will now be described in more detail, by way of example only, with reference to the accompanying drawings.

Figure 1:
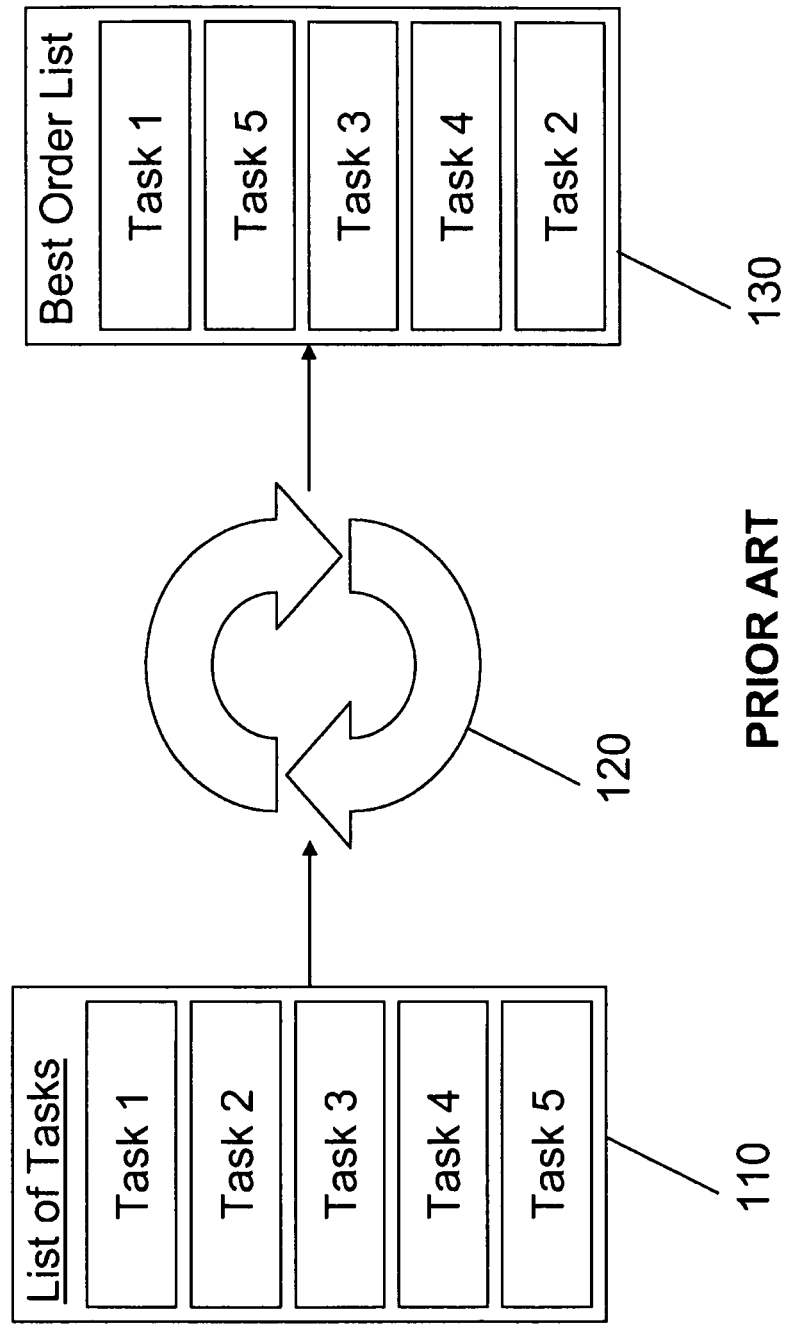
FIG. 1 is a diagram illustrating the method of the most common known scheduling scheme for radars.
Figure 2:
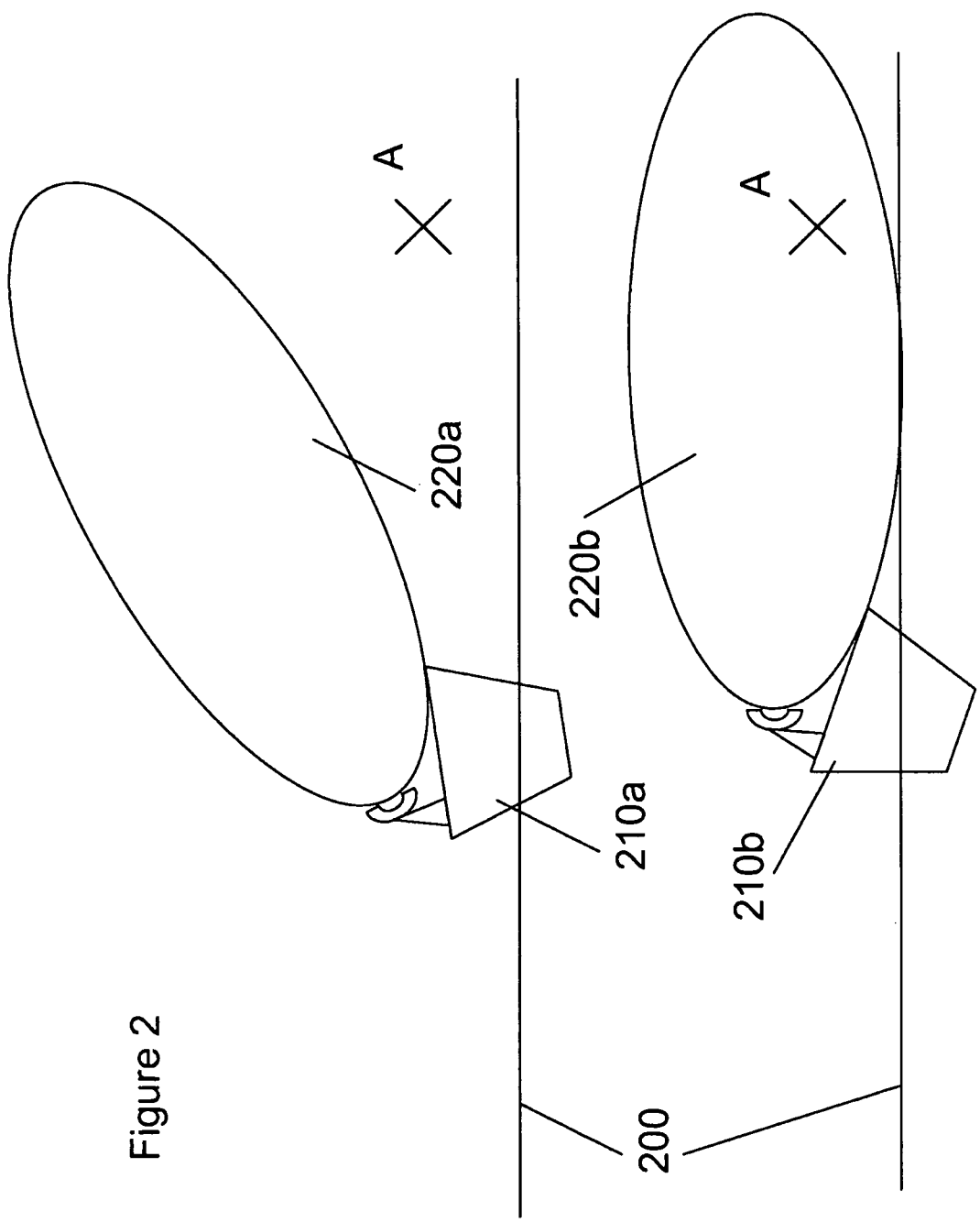
FIG. 2 is a diagram showing a naval situation illustrating how the radar visibility changes with movement of the naval platform upon which it is mounted.
Figure 3:
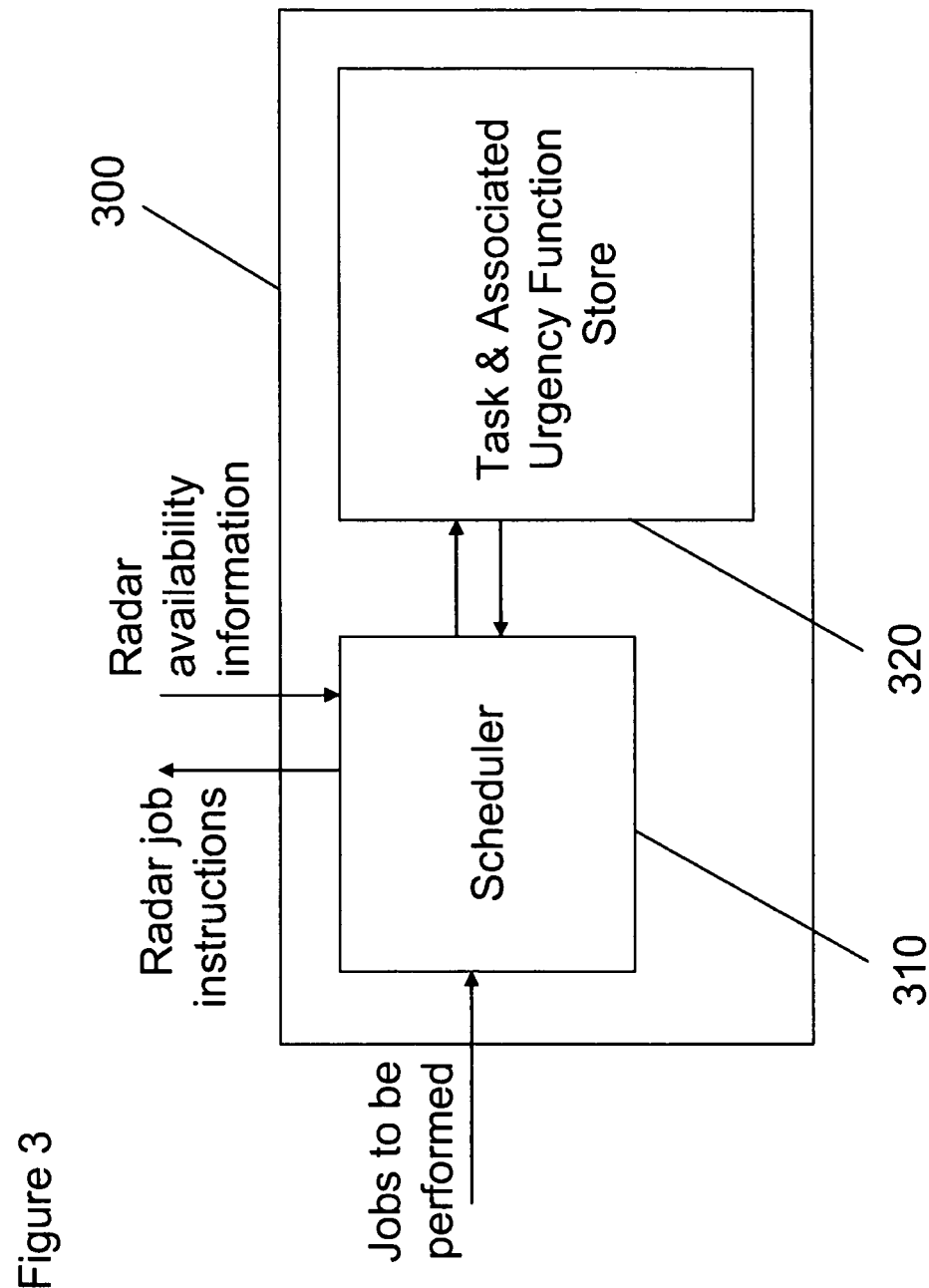
FIG. 3 is a diagram showing an embodiment of the scheduler of the present invention.
Figure 4:
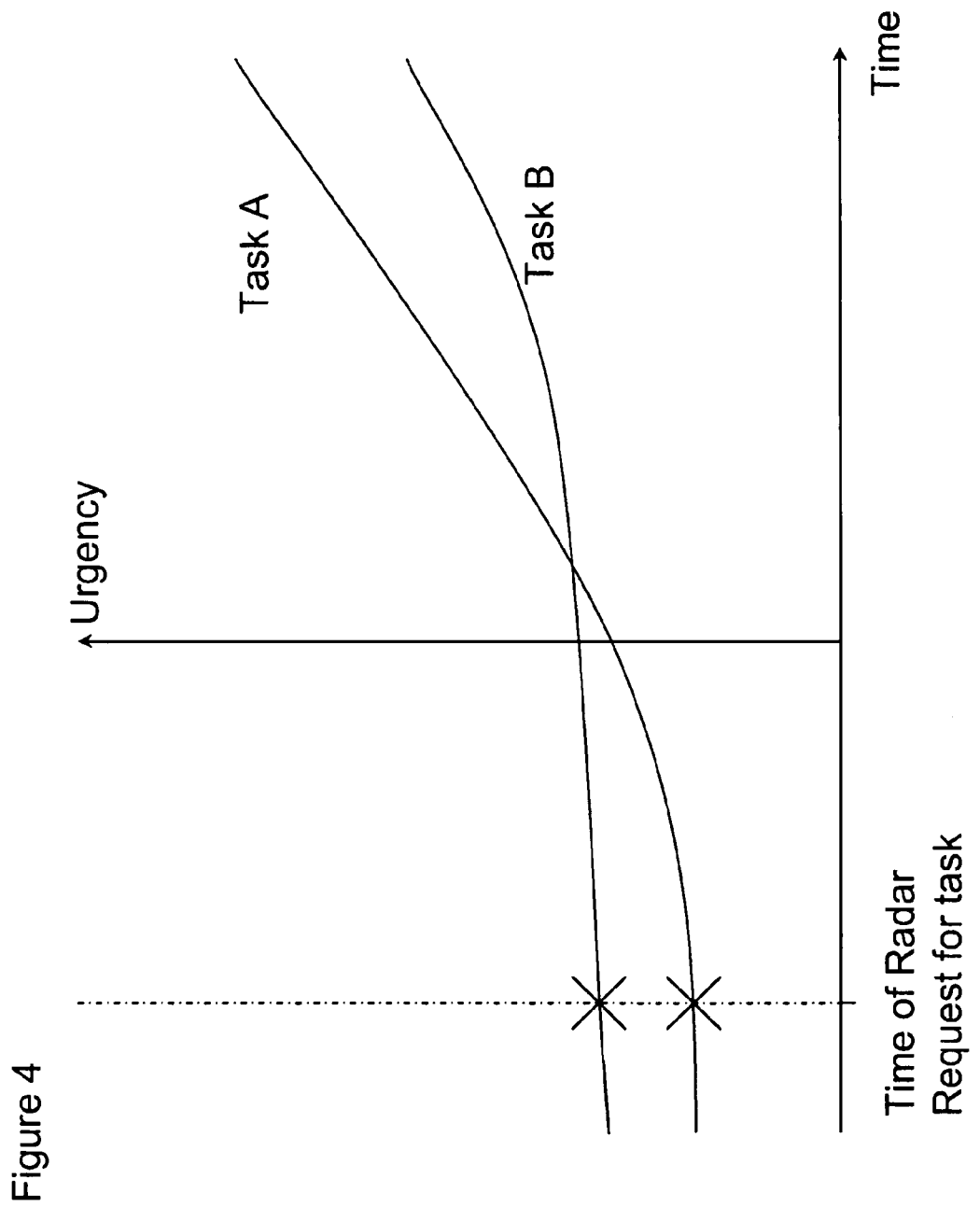
FIG. 4 is a graph plotting urgency functions against time for two example tasks.
Figure 5:
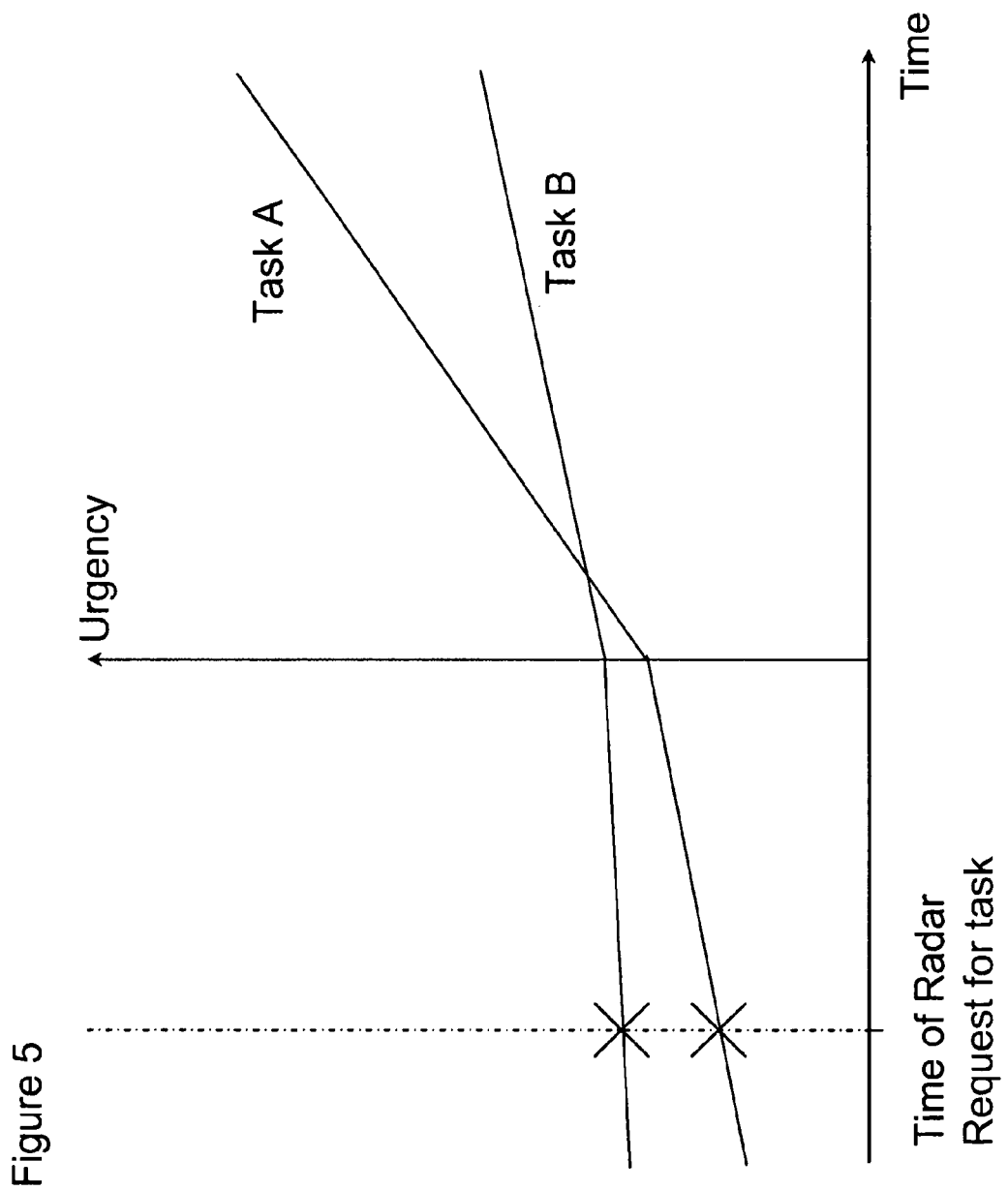
FIG. 5 is a graph plotting the simplified urgency functions against time for the two example tasks of FIG. 4.
Figure 6:
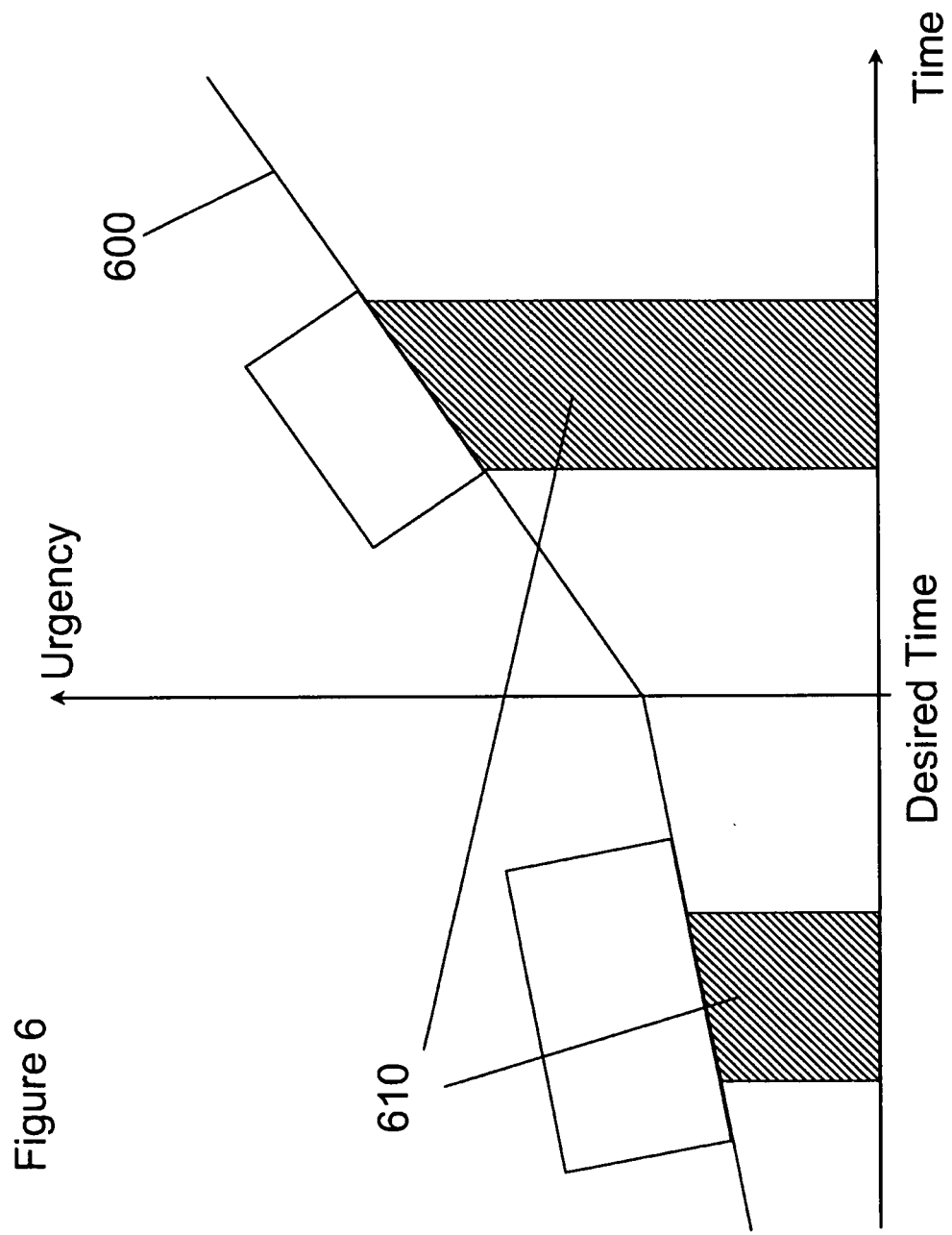
FIG. 6 is a graph plotting a simplified urgency function against time for one of the example tasks of FIGS. 4 and 5 and also showing when the target is not visible.

The scheduler arrangement 300 is shown in FIG. 3. The scheduler 310 receives requests for tasks that need to be performed from various sources, for example surveillance search sectors, radar tracking, BITE etc. (not shown) and receives radar availability information from the radar antenna. It also connected provides the next job for execution to the antenna when the radar says it will next be free.

When the scheduler 310 receives a new job, the job has an urgency function calculated for the job and is added to the task and function store 320.

The urgency function of a task is a function based on the respective drop dead time of the task, desired time for completion of the task; and relative importance of the task. The function has to be monotonically increasing with time, such that the urgency value never decreases as time elapses.

In the specific embodiment of the present invention, the urgency function used is a linear function with different gradients before and after the desired time for completion of the task. This greatly reduces the mathematical complexity in subsequent processing. The urgency functions in this embodiment are given by:

$$U(t) = u0 + u1*(t-td) \forall t \leq td; \text{ and} \qquad \text{Equation 1}$$

$$U(t) = u0 + u2*(t-td) \forall t > td \qquad \text{Equation 2}$$

where u is the urgency function, t is time, td is the desired time of execution of the look, U(t) is the urgency function and t is time. Equation 1 thus deals with the urgency before the desired time and Equation 2 deals with the urgency after the desired time.

It will be understood that non-linear functions can be used but that this increases the complexity of any subsequent processing. Only certain types of non-linear functions can be ordered in a similar way to linear functions. By using the properties of linear functions, looks with the same values of u1 and u2 as their before and after desired time urgency gradient can be ordered into two sets, one before desired time and one after at some reference time. This ordering of urgency will then not change with time. This enables the most urgent look of any given type to be selected without having to determine the actual urgencies of all the looks of that type at any given time. This ordering ability is true of only those functions that can be represented by a polynomial in positive powers with positive coefficients. For such urgency functions the ordering then becomes desired time ordered with earliest desired time first.

For each task that is received for scheduling by the scheduler 310, an urgency function is computed for that task and then it is stored in the task and function store 320. When each urgency function is stored in the task and function store 320, it is placed in order of urgency. Each different type of look, including different 'priorities' of a given look type (for instance different surveillance sectors) will have its own pair of before and after desired time urgency ordered lists with the most urgent look within each list placed at the front of the list.

The process of placing a new look onto the relevant list involves searching the list to find the correct location for the look on the list and then 'slotting' the look into the list at this location. This is done with a search and slot-in routine, based on a combination of a double linked list and pointers maintained for use in a 'binary chop' search, in this embodiment. A wide number of other routines well known to the experts in software could be used instead.

At regular intervals, looks in these lists that have 'expired' are removed from the lists as a housekeeping exercise to minimize the search times.

When a look for execution is requested the lists are searched in order to find the most urgent look by starting with the first look on the list (most urgent in that list. If that look is not currently visible (executable), the visibility of the next entry on its list is determined. This process continues until a visible look is found (which, by virtue of the ordering of the list, is of necessity the most urgent visible look on the list) or the list exhausted. If a visible look is found, its urgency is then calculated and, if it is more urgent than the previously found 'most urgent' look, it becomes the most urgent look so far and the search moves on to the next list.

When all the lists have been 'searched', the look that has been found to be the most urgent is passed on for execution and also removed from its urgency list and any other lists it might appear on.

A refinement that can be added to the process in this embodiment is to remove from the list any look found to have 'expired' at the time of the urgency search. The process of removing a look from its urgency lists can, where relevant, be used to signal to the look requestor that the look has been sent for execution or failed as the case may be.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of scheduling tasks in a radar apparatus, the method comprising:
  receiving a task to schedule, the task having a desired time for execution;
  computing for the task, a time based urgency function for before the desired time for the task and a time based urgency function for after the desired time for the task, wherein each urgency function has a gradient and monotonically increases with time;
  identifying for the task, from before desired time lists and after desired time lists where each respective list stores tasks having urgency functions of the same gradient value, a before desired time list and an after desired time list matching the respective gradient values of the computed urgency functions for the task;
  storing, in a memory device, the task, the associated urgency function for before the desired time, and the associated urgency function for after the desired time, the storing including placing the task in the identified before desired time list and placing the task in the identified after desired time list, wherein the placing comprises ordering the tasks in the same list based on increasing desired time for execution of the tasks;
  locating, when a task is to be performed, the task having the highest urgency value, the locating comprising calculating the urgency value of the first executable task in each of the plurality of before desired time lists and the plurality of after desired time lists; and
  passing to a radar for execution the located task having the highest urgency value.

2. The method according to claim 1, further comprising: storing tasks in a task and function store.

3. The method according to claim 1, wherein the urgency function is a linear function.

4. The method according to claim 1, further comprising: storing tasks with similar urgency functions together in groups.

5. The method according to claim 1, further comprising: storing together in groups tasks that should be performed together.

6. The method according to claim 1, wherein the urgency function is a linear function with different gradients before and after said desired time for completion.

7. The method according to claim 4, further comprising: storing together in groups tasks that should be performed together.

8. A radar apparatus for scheduling tasks, comprising:
  a memory device;
  a receiving arrangement to receive a task to schedule, the task having a desired time for execution;
  a computing arrangement to compute for the task, a time based urgency function for before the desired time for the task and a time based urgency function for after the desired time for the task, wherein each urgency function has a gradient and monotonically increases with time;
  identifying arrangement to identify for the task, from before desired time lists and after desired time lists where each respective list stores tasks having urgency functions of the same gradient value, a before desired time list and an after desired time list matching the respective gradient values of the computed urgency functions for the task;
  storing arrangement to store, in the memory device, the task, the associated urgency function for before the desired time, and the associated urgency function for after the desired time in said memory device, wherein the storing arrangement is further configured to place the task in the identified before desired time list and place the task in the identified after desired time list, the placing comprises ordering the tasks in the same list based on increasing desired time for execution of the tasks;
  a locating arrangement to locate, when a task is to be performed, the task having the highest urgency value, the locating comprising calculating the urgency value of the first executable task in each of the plurality of before desired time lists and the plurality of after desired time lists; and
  a passing arrangement for passing to a radar for execution the located task having the highest urgency value.

9. The apparatus according to claim 8, wherein the receiving, computing, identifying, storing, locating, and passing arrangements, and the memory device, are included in a computer system configured for communicatively coupling to a radar.

10. The apparatus according to claim 8, further comprising: a storing arrangement to store tasks with similar urgency functions together in groups.

11. The apparatus according to claim 8, further comprising: a storing arrangement to store together in groups tasks that should be performed together.

12. The apparatus according to claim 9, further comprising: a storing arrangement to store together in groups tasks that should be performed together.

13. The apparatus according to claim 8 wherein the task includes at least one of a surveillance search, a radar tracking, and a BITE, which need to be performed based on radar availability.

14. The method according to claim 1, further comprising: removing at least one of expired tasks and the located task having the highest urgency value that is passed on for execution from lists they appear on.

15. The method according to claim 1 wherein the task comprises a look, wherein the look defines a surveillance search sector, and wherein the locating further includes determining that the surveillance search sector associated with the look is visible.

16. The method according to claim 1 wherein the urgency function can be represented by a polynomial in positive powers with positive coefficients.

17. The method according to claim 15 wherein the urgency function can be represented by a polynomial in positive powers with positive coefficients.

18. The apparatus according to claim 8 wherein the task comprises a look and the locating arrangement is arranged to locate, when a task is performed, the visible task having the highest value of the urgency function.

19. The apparatus according to claim 8 wherein the urgency function can be represented by a polynomial in positive powers with positive coefficients.

20. The apparatus according to claim 18 wherein the urgency function can be represented by a polynomial in positive powers with positive coefficients.

21. The method according to claim 1, wherein the urgency function has a gradient and the storing comprises storing the task in lists of tasks, the tasks in a list having urgency functions with the same gradient.

22. The method according to claim 1, wherein the storing comprises storing the task in lists using a binary chop search to find the correct location for the task in each list.

23. The method according to claim 1 wherein the locating comprises searching for the executable task ordered in the list as having the highest urgency value.

24. The apparatus according to claim 8, wherein the storing arrangement is configured to store the task in lists of tasks, the tasks in a list having urgency functions with the same gradient.

25. The apparatus according to claim 8, wherein the storing arrangement is configured to store the task in lists using a binary chop search to find the correct location for the task in each list.

26. The apparatus according to claim 8, wherein the locating arrangement is configured to locate the executable task ordered in the list as having the highest urgency value.

* * * * *